Figure 1:
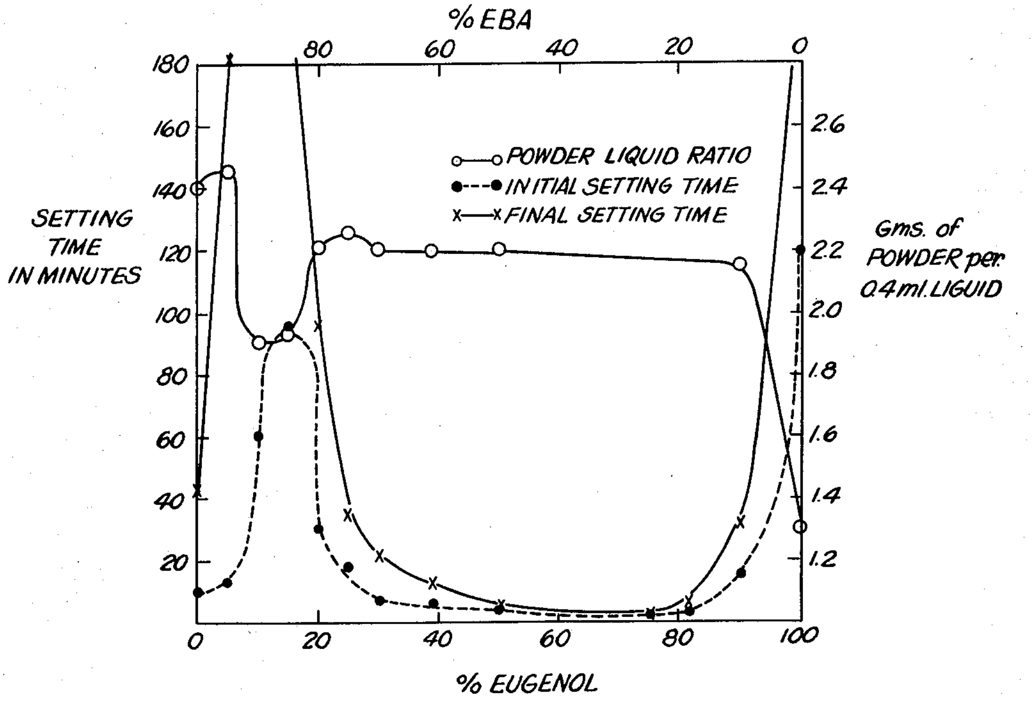

May 10, 1960 G. M. BRAUER 2,936,242

CEMENTS FROM METAL OXIDES AND CHELATING AGENTS

Filed April 10, 1958 2 Sheets-Sheet 1

INVENTOR

Gerhard M. Brauer

BY Arthur Vinograd

ATTORNEY

May 10, 1960 G. M. BRAUER 2,936,242

CEMENTS FROM METAL OXIDES AND CHELATING AGENTS

Filed April 10, 1958 2 Sheets-Sheet 2

INVENTOR

Gerhard M. Brauer

BY

Arthur Vinograd

ATTORNEY

United States Patent Office 2,936,242
Patented May 10, 1960

2,936,242
CEMENTS FROM METAL OXIDES AND CHELATING AGENTS

Gerhard M. Brauer, Washington, D.C., assignor to the United States of America as represented by the Secretary of Commerce Application April 10, 1958, Serial No. 727,752

12 Claims. (Cl. 106—35)

This invention relates to cementitious preparations, impression and filling materials suitable for use in dental practice and the like and to methods for preparing the same.

As is well known, mixtures of zinc oxide and eugenol are presently employed as antibacterial agents in the treatment of carious lesions, as palliatives, and with modifiers as an impression compound and as a surgical cement. Mixtures of zinc oxide and eugenol, however, harden slowly at room temperatures and, according to known practice, accelerators such as zinc acetate are therefore employed to shorten the setting time. However, the latter products have a relatively low compressive strength (3,000 p.s.i.) which is not sufficient for many dental purposes. Moreover, due to the inhibitory effect of the phenolic group in eugenol, it is not possible to polymerize acrylic monomers over surfaces which have been previously treated with zinc oxide-eugenol mixtures.

The setting mechanism of the reaction between zinc oxide and eugenol has been investigated by Copeland, Brauer, Sweeney, and Forziati, Jour. Res. NBS, 55, 133 (1955). These investigations have shown that the hardened mass consists of zinc oxide embedded in a matrix of long, sheath-like crystals of zinc eugenolate. The excess eugenol is sorbed by both the zinc eugenolate and the zinc oxide. It was also observed from such investigation that the zinc eugenolate formed during the reaction has a chelate structure.

The present invention is based upon the realization of the beneficial effects produced by certain chelating agents on both zinc oxide and zinc oxide-eugenol mixtures.

In accordance with the principles of the present invention it has been experimentally determined that chelating agents such as those selected from the group consisting of o-ethoxybenzoic acid, o-salicylaldehyde, acetylacetone, and ethylenediamine have the effect, when combined with zinc oxide, of forming a hard coherent mass within a few minutes. Such compound is therefore suitable for use as a dental material. Moreover, it has been determined that the use of such chelating agents is not limited to zinc oxide. Mixtures with oxides of group IIA of the periodic table also produced a rapid setting mass. Oxides of group IIB of the periodic table (ZnO, CdO, HgO) when mixed with the above chelating agents also form hard cohesive materials as does lead oxide (litharge) of group IVB.

It is accordingly an immediate object of the present invention to provide an improved cementitious material suitable for dental work which is quick-setting and of improved strength and durability.

It is a further object of the present invention to provide a cementitious material of the character described which will not inhibit polymerization of materials such as vinyl or acrylic monomers applied to surfaces treated with the cementitious preparation of the present invention.

It is an additional object of the present invention to improve the setting characteristics and strength of materials such as ZnO and ZnO-eugenol mixture so as to make them more efficacious as a dental material.

It is a still further object of the present invention to further improve the quality of zinc oxide powder mixes by incorporating filler such as fused silica to raise the powder-liquid ratio and thereby improved the physical properties of the mixture. The addition of such silicas also reduces the water solubility of the material.

Still another object of this invention is to provide a zinc oxide-o-ethoxybenzoic acid-eugenol compound which is especially suitable as a dental impression material, as a temporary filling, or for other tooth treatment.

Other uses and advantages of the invention will become apparent upon reference to the specification and drawings, in which Fig. 1 is a plot showing the setting time and powder-liquid ratio of zinc oxide-EBA mixes formulated in accordance with the principles of the present invention.

Figures 2, 3:
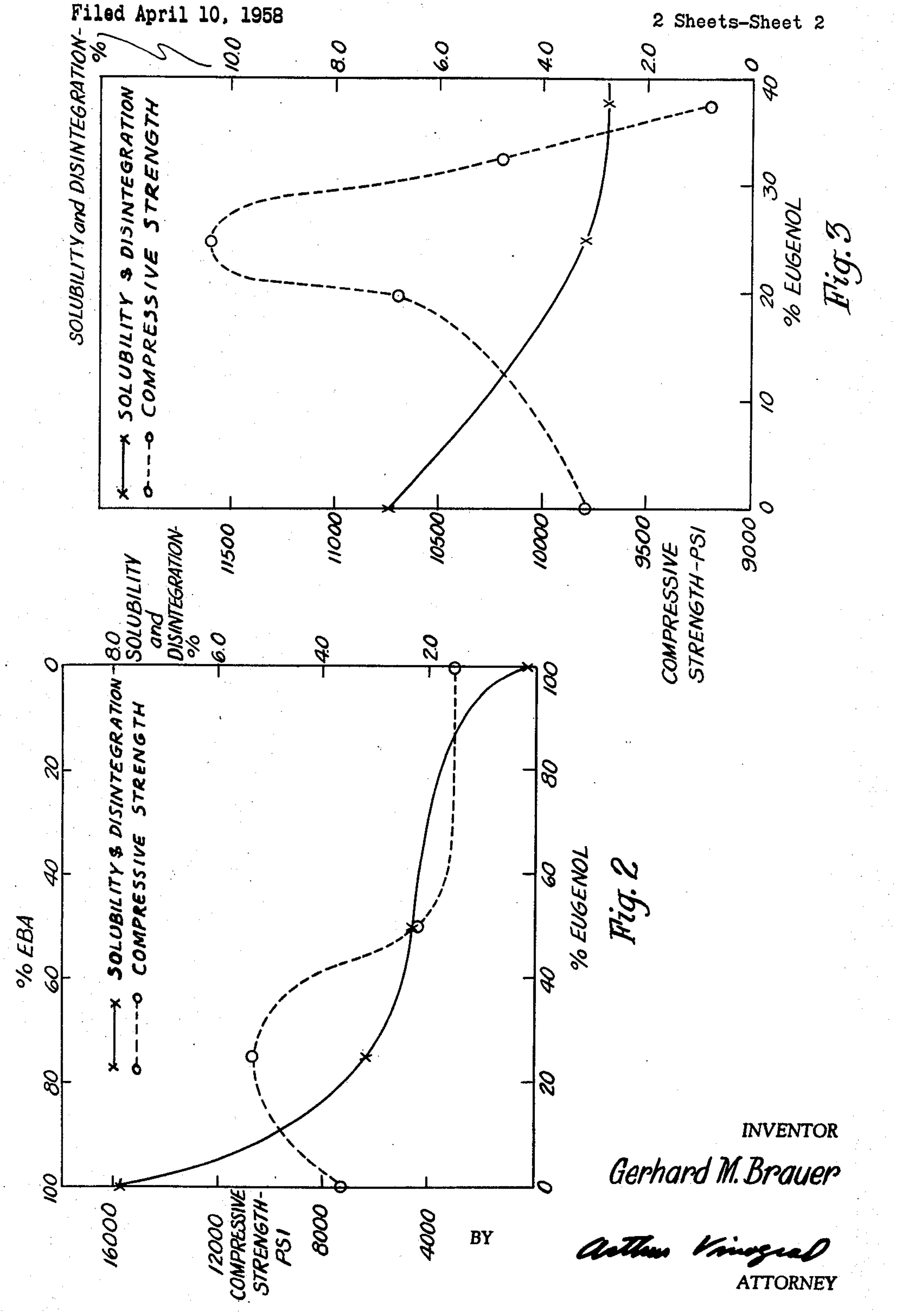

Fig. 2 are curves showing the compressive strength and solubility of zinc oxide-EBA mixtures, and Fig. 3 shows the compressive strength and solubility of zinc oxide-quartz-EBA eugenol mixtures.

Zinc oxide-eugenol mixtures form a hard, coherent mass that is useful in a number of dental applications. The hardened mass consists of zinc oxide embedded in a matrix of a zinc eugenolate chelate with the empirical formula $(C_{10}H_{11}O_2)_2Zn$. Mixtures of zinc oxide with ortho substituted phenols such as isoeugenol, guaiacol and methylguaiacol also harden. As would be expected from the reaction mechanism phenols which do not contain ortho substituents or which contain substitutents that are incapable of chelation do not undergo this reaction.

The presently available commercial zinc oxide-eugenol mixtures however, harden rapidly only in the presence of accelerators and the resulting products have low compressive strength. Moreover, the materials inhibit the polymerization of acrylic monomers. Hence, acrylic resins will not polymerize in direct contact with these materials.

The present invention is directed to the reaction of liquid chelating agents (other than eugenol, isoeugenol or guaiacol that have been known to the art), and zinc oxide or other suitable inorganic compounds such as those comprising groups IIA and IIB to form coherent cementitious materials.

Specifically, it has been found in accordance with the principles of the present invention that when certain chelating agents such as o-ethoxybenzoic acid, o-salicylaldehyde, acetylacetone and ethylenediamine are combined with a substance such as zinc oxide, a hard coherent product is formed within a few minutes.

It has also been found that other compounds such as salicylic acid esters and acetoacetic acid esters form coherent products but of somewhat lesser compressive strength within a few hours. Most of the chelating agents (concerned with the present invention) contain carboxylic acid, phenolic or enol groups.

While ZnO has long been employed in the preparation of dental filling compounds, the reaction involved in the present invention is not limited to ZnO. It has been found that the above chelating agents react well with the oxides of both group IIA and IIB of the periodic table to form hard cohesive materials and also with lead oxide (litharge) of group IVB. For example, mercuric chloride forms a hard, although brittle product.

Zinc oxide-o-ethoxybenzoic acid (EBA) mixes show some of the most desirable properties. The advantages of such compounds are readily apparent when compared with the physical characteristics of the known prior art zinc oxide-eugenol mixture as is shown in Table I.

TABLE I.—COMPARATIVE PROPERTIES OF ZINC OXIDE-EUGENOL AND ZINC OXIDE-EBA MIXTURES

| | Zinc oxide-eugenol | Zinc Oxide-EBA |
|---|---|---|
| Setting time, min | 120 | 11. |
| Grams of powder used per 0.4 ml. liquid [a] | 1.30 | 2.30. |
| Compressive strength, p.s.i | 3,000 | 7,200. |
| Density | | higher. |
| Adhesion | | improved. |
| Inhibition of polymerization | strong | none. |

[a] Powder-liquid ratio that yields a mix of standard consistency as defined by American Dental Association Specification No. 9.

It will be noted from the above table that a compound formed by the combination of zinc oxide with a chelating agent of the present invention provides an increase in compressive strength, a better powder-liquid ratio, increased density, and adhesion and a marked decrease in setting time as indicated in the second column of the above table. Moreover, the hardened mixture does not inhibit polymerization of acrylic monomers (as has been above noted).

Striking improvements were also obtained upon the addition of up to 98% eugenol to EBA-zinc oxide mixtures. The setting time of zinc oxide-eugenol mixtures is decreased rapidly upon incorporation of even small amounts of EBA or other acids capable of acting as chelating agents for zinc oxide-eugenol mixes. The additional use of zinc acetate or other well known accelerators further increases the speed of setting.

Zinc oxide and EBA-eugenol mixes require a larger powder-liquid ratio and therefore yield products of higher density. The compressive strength is increased to a maximum of 10,600 p.s.i. The advantages gained by incorporating a chelating agent such as EBA in a zinc oxide-eugenol mixture over a conventional zinc oxide-eugenol mixture are demonstrated in Table II.

TABLE II.—COMPARATIVE PROPERTIES OF ZINC OXIDE-EBA-EUGENOL MIXTURES

| | ZnO+ eugenol | ZnO +50% EBA, 50% eugenol | ZnO +75% EBA, 25% eugenol |
|---|---|---|---|
| Setting time, min | 120 | 4 | 18 |
| Powder in g. incorporated in 0.4 ml. liquid | 1.30 | 1.80 | 2.25 |
| Compressive strength, p.s.i | 3,000 | 4,400 | 10,600 |
| Density, g./ml | 2.68 | | 3.31 |
| Water solubility, percent | 0.10 | 2.28 | 3.15 |

The increased water solubility of eugenol-EBA mixes may be decreased by using suitable EBA derivatives containing hydrophobic side chain substituents or other compounds known in the art for decreasing solubility such as silicones.

The additional use of fillers such as fused silica (quartz) further improves the physical characteristics of the product. For example, with a mix containing 89.2% ZnO, 30.8% quartz powder, 75% EBA, 25% eugenol, 3.25 grams of powder could be incorporated into 0.4 ml. liquid. The product hardened in less than 8 minutes and had a compressive strength of 11,600 p.s.i.

The above outlined results were achieved by employing the methods now to be specifically detailed.

*Experimental procedures*

*Materials.*—Zinc oxide reagent grade was employed. Over 50% of the powder passed through a No. 70 sieve but was retained by a No. 100 sieve.

Ground opaque fused silica (quartz) made by Thermal Syndicate, Ltd. was employed over 50% of the material, passed a No. 100 sieve and was retained by a No. 200 sieve.

The silicone employed in some of the experiments was made by the Silicone Division, Union Carbide and Carbon Company.

The o-ethoxybenzoic acid, 2-methoxy, 4-methylphenol and isoeugenol employed were Eastman practical grade. All other chemicals were reagent grade.

*Methods*

*Consistency of mix.*—For some zinc oxide-EBA mixes the powder-liquid ratio of a mix of standard consistency was determined as outlined in American Dental Association Specification No. 9. See American Dental Association Specification for Dental Materials 1956. Besides the powder-liquid ratio the consistency depends on the technique used for mixing the constituents. By changing such factors as the rate of spatulation and pressure it is possible to prepare mixes of standard consistency that show variations of 10% in the amount of powder incorporated. While results obtained by different individuals may show variations as high as 10%, it was found that such variations of the powder-liquid ratio will not alter appreciably the setting time of the mixes.

*Setting time.*—The setting time is defined as the number of minutes elapsed from the starting of the mix to the time when the point of a penetrating instrument such as the point of a Gilmore needle fails to make a perceptible indentation on the surface of the specimen. Setting times were determined either at room temperature or at 37° C.

Setting times of mixtures that harden in 10 minutes or longer are difficult to determine. Often, the mass of the mixture almost hardens within a few minutes, but on placing the needle on the surface of the material a small but still perceptable circle is produced even after many hours. The initial setting times listed in the tables to follow refer to the time period after which only a slight indentation is visible after placing the needle on the material for 5 seconds. For a number of mixtures the time after which no perceptible circle is visible was determined and is also shown as final setting time in the tables.

It should be noted that the setting time depends largely on the experimental conditions used. Therefore different values were obtained when the tests were conducted at different temperatures and relative humidities.

The setting times were determined using the amount of powder and liquid given in Table II. The powder-liquid ratios used were determined by previous experiments and give mixes of approximately standard consistency. Mixing was accomplished by placing weighed amounts of powder and 0.4 ml. liquid on a glass slab. The powder was then divided into four portions. The first was completely incorporated using a stainless steel spatula before the next portion was brought in contact with the liquid. The mix was thoroughly spatulated until no unmixed powder remained. Since some mixes of standard consistency required a great deal of powder the mixing time to incorporate the powder varied from 2 to 4.5 min. Hence, the time at which the brass ring and mix was placed in an atmosphere of 100% relative humidity at 37° C. was 3.5±1.5 min. after starting the mix. With the exception of this modification the setting time was determined with a 1-lb. standard Gilmore needle as described in American Dental Association Specification No. 9 for Dental Silicate Cements.

*Compressive strength.*—Compressive strength was determined by the method outlined in A.D.A. Specification No. 9 previously referred to. The ends of the mold were covered by pieces of Teflon, 0.03 mm. thick and by flat glass plates held against the ends of the mold by a C clamp. The mold was placed in a bath at 37° C. and 100% relative humidity for one hour. After removal of the glass plates and Teflon, the ends of the specimen were ground flat. The specimen was pressed out of the mold and immersed in water at 37° C. for 23 hours. Specimens were then crushed at the rate of 370 lb./min.±10%.

*Density.*—The density of the products was determined by using approximately 1 g. of specimen in a 50-ml. pyenometer with water as displacement liquid.

*Effect of zinc oxide-EBA products on polymerization.*—A few tests were conducted to evaluate zinc oxide-EBA mixtures as cement liners for acrylic resins. Mixes containing various proportions of eugenol-EBA and zinc oxide were placed in split molds 6 mm. in diameter and 12 mm. in length. At time intervals ranging from 10 to 90 minutes after placing the cement, room temperature curing resin was put on top of the cement by a "paint-in" technique.

*Reaction of zinc oxide with various chelating agents.*—Mixtures of zinc oxide and liquids that may be capable of forming chelated products were prepared. Results are given in Table III.

TABLE III.—REACTION OF ZINC OXIDE WITH CHELATING AGENTS AT ROOM TEMPERATURE

| Chelating Agent | Grade of Zinc Oxide | Approximate Setting Time, Min. | Properties of Product |
|---|---|---|---|
| 2-methoxy-4-methylphenol | HF | 2 | fairly hard. |
| o-ethoxybenzoic acid | RG | 0.2 | colorless, hard. |
| Do | HF | 0.2 | reddish, hard. |
| o-ethoxybenzoyl chloride | RG | <1 | yellow- fairly hard adhesive. |
| Do | HF | <1 | reddish, sticky. |
| Do | 95% RG, 5% HF | 0.03 | yellow, hard brittle. |
| methyl salicylate | RG | <20 | colorless cake, crumbly. |
| ethyl salicylate | RG | <18 | colorless, coherent crumbles. |
| o-salicylaldehyde | RG | 1 | yellow-green, hard. |
| Do | HF | 2 | brown, hard. |
| o-methoxybenzaldehyde | RG | <70 | greyish, putty-like. |
| o-hydroxyacetophenone | HF | <24 | reddish, soft coherent cake. |
| ethyl acetoacetate | RG | 4 | colorless, soft coherent cake. |
| acetylacetone | RG | 0.02 | colorless, hard. |
| Do | HF | 0.02 | reddish, hard. |
| ethylenediamine | RG | 2 | colorless, fairly hard, brittle. |
| Do | HF | 4 | reddish, fairly hard, brittle. |

o-Ethoxybenzoic acid reacts with reagent grade or Hyperfine zinc oxide to form a hard product in about 12 min. Zinc oxide-o-salicylaldehyde and -o-ethoxybenzoyl chloride mixtures harden fairly readily (1 to 2 hours). A small percentage of Hyperfine zinc oxide incorporated in the reagent grade greatly speeds up the setting time of o-ethoxybenzoyl chloride mixes. Similar mixes with other chelating agents do not show this effect. Some aliphatic chelating agents, especially those containing acidic groups (lactic acid, ethoxyacetic acid), and some compounds capable of enolization (acetylacetone) harden rapidly. The products are quite water soluble and usually disintegrate when placed in water. A number of compounds, such as esters of salicylic acid, acetoacetate, citraconic anhydride and ethylenediamine, form coherent products of relatively low compressive strength after a few hours. At room temperature under atmospheric conditions, mixes of eugenol, isoeugenol, guaiacol and 2-methoxy-4-methylphenol harden more rapidly with Hyperfine than with reagent grade zinc oxide. It appears likely that the ammonia present in the Hyperfine materials acts as an accelerator for mixes containing o-methoxyphenols. With the other chelating agents differences in setting time and properties of the product vary little on substituting Hyperfine zinc oxide for the reagent grade.

*Reaction of various oxides with o-ethoxybenzoic acid.*—Since o-ethoxybenzoic acid appeared to be the most effective chelating agent, a study of the reaction of various oxides with this compound was undertaken. The results are summarized in Table IV.

TABLE IV.—REACTION OF VARIOUS OXIDES WITH o-ETHOXYBENZOIC ACID AT ROOM TEMPERATURE

| Material | Approximate Seeting Time, Min. | Properties of Product |
|---|---|---|
| Magnesium oxide | 3 | white, hard, brittle. |
| Calcium oxide | <½ | grey, very brittle. |
| Barium monoxide | <½ | pink-grey, hard, brittle. |
| Zinc oxide (reagent) | 11 | hard, adhesive. |
| Cadmium oxide | 2-6 | dark brown, hard. |
| Mercuric oxide (yellow) | 2-15 | orange, hard, brittle. |
| Mercuric oxide (red) | 4 | red, hard. |
| Lead monoxide (litharge) | ½ | hard, yellow. |

Oxides of group IIA (MgO, CaO, BaO) of the periodic table react rapidly to form hard, brittle materials. The oxides of group IIB (ZnO, CdO, HgO) form hard, cohesive products as does lead oxide (litharge) in group IVB. The other oxides either do not react with o-ethoxybenzoic acid or form soft putty-like products.

Substituting magnesium oxide for zinc oxide in EBA mixes shortens the setting time and lowers compressive strength and increases considerably the solubility and disintegration.

Partial replacement of zinc oxide with calcium oxide decreases the setting time. With some mixes, the setting time decreases to such an extent that not all of the powder and liquid can be thoroughly mixed before the mixture has set. Calcium oxide mixes result in an exothermic reaction. Where high percentages of calcium oxide are employed, the setting cement "boils" making the product very porous.

*Reaction of zinc oxide with o-ethoxybenzoic acid-eugenol mixtures.*—Since preliminary studies showed that zinc oxide-EBA mixtures disintegrate slowly in water, a series of EBA-eugenol solutions was mixed with zinc oxide.

The addition of even small amounts of EBA to eugenol increases markedly the amount of powder that can be incorporated to obtain a mixture of standard consistency as is shown in Fig. 1. Fig. 1 shows that the addition of EBA to eugenol also decreases the setting time of the mixes. A minimum initial setting time of 3 min. is obtained with 25% EBA—75% eugenol as compared to 120 min. for 100% eugenol. The setting time remains short over the 20% to 70% EBA concentration range and increases rapidly on further increase in the EBA concentration. However, mixes containing 100% EBA show a much lower setting time than those containing 15% or less eugenol.

The addition of EBA increases the solubility and disintegration characteristics of the products from 0.10% for zinc oxide-eugenol to 7.9% for zinc oxide-EBA mixes as indicated in Fig. 2. Compressive strength increases on incorporating EBA and reaches a maximum of 10,600 p.s.i. at a concentration of 75% EBA as shown in Fig. 2. Higher concentrations lower the compressive strength. The density increases from 2.68 for zinc oxide-eugenol to 3.31 g./ml. for mixes containing 75% EBA. No quantitative tests were conducted on the adhesive properties of the products. However, the behavior of the materials during the tests indicates that addition of EBA increases the adhesive properties.

The effect of zinc oxide particle size on the powder-liquid ratio and setting time of mixes containing a 75% EBA—25% eugenol solution is given in Table V.

TABLE V.—SETTING TIMES OF EBA-EUGENOL SOLUTIONS WITH ZINC OXIDES OF VARYING PARTICLE SIZE

Temperature ---- 37° C.
Relative humidity ---- 100%.
Liquid ---- 75% EBA; 25% eugenol.

| Grade of Zinc Oxide | Average Diameter of Particle,[a] microns | Surface Area,[a] m.2/g. | Standard Consistency, g./0.4 ml. | Setting Time, min. Initial | Setting Time, min. Final | Remarks |
|---|---|---|---|---|---|---|
| Reagent | ------ | ------ | 2.30 | 24 | 88 | |
| XX-78 | .3 | 4 | 2.15 | 26 | 72 | |
| Kadox-72 | .2 | 6.5 | 2.05 | 34 | 77 | |
| Kadox-15 | .1 | 10 | 1.80 | 36 | 81 | |
| USP | ------ | ------ | 1.60 | 34 | 70 | |
| Micronized USP. | ------ | ------ | 2.70 | 25 | 81 | |
| No. 513 | 0.04 | 31 | 0.25 | 26 | 54 | very brittle. |
| Hyperfine | .02 | ------ | 0.50 | 55 | 113 | |

[a]Values given by the manufacturer.

It will be noted that the powder-liquid ratio used for a standard consistency mix decreases with decreasing particle size. It appears that the setting time is more dependent on the method of manufacture of the zinc oxide than on the dimensions of the zinc oxide particles. Thus, at 37° C. and 100% relative humidity, the EBA-Hyperfine mix hardens slowly whereas zinc oxide No. 513 has the shortest final setting time. The greater reactivity of the No. 513 zinc oxide is probably due to the presence of 2.5 to 3% carbonate in the material.

The effect of addition of fillers to zinc oxide-EBA-eugenol mixes on the setting time and on the physical properties of the products was also investigated. Results of these studies are shown in Tables VI and VII and Fig. 3.

The addition of quartz increases the total amount of powder which can be incorporated to yield a mix of approximately standard consistency as shown in Table VI. The quantity of zinc oxide in the mix is not altered appreciably by the addition of the quartz. Setting time of the mixes is shortened and can be further decreased by the addition of 0.6% zinc acetate accelerator. Products of slightly higher compressive strength with a maximum value of 11,600 p.s.i. were obtained for a mixture containing 69.2% zinc oxide, 30.8% quartz, 75% EBA—25% eugenol as shown in Fig. 3. Solubility and disintegration of the products is little affected by incorporation of quartz in the mixes. Addition of 5% silicone R-23 to the 75% EBA—25% eugenol liquid does not change the setting time but decreases the solubility and disintegration of the products from 3.2% to 2.5%.

Calcium oxide or magnesium oxide when incorporated with zinc oxide, eugenol and EBA give a fast setting mix (Table VII). The product has a smooth surface, but has low crushing strength.

It may be possible to lower the solubility of the products of the zinc oxide-eugenol-EBA reaction by incorporation into the mixture tailor-made ethoxybenzoic acid derivatives. Such compounds should be liquids containing hydrophobic side chains at the unsubstituted positions of the ring.

TABLE VI.—PHYSICAL PROPERTIES OF o-ETHOXYBENZOIC ACID-EUGENOL-ZINC OXIDE-QUARTZ MIXES

Temperature ---- ° C. 37
Relative humidity ---- percent 100

| Composition[a] Solid ZnO | Composition[a] Solid Quartz | Composition[a] Liquid EBA | Composition[a] Liquid Eugenol | Powder used for 0.4 ml. liquid | Initial Setting Time | Compressive Strength |
|---|---|---|---|---|---|---|
| *Percent* | *Percent* | *Percent* | *Percent* | *G.* | *Min.* | *P.s.i.* |
| 69.2 | 30.8 | 100 | ------ | 3.20 | 10.0 | 9,200 |
| 69.2 | 30.8 | 80.0 | 20.0 | 3.00 | 6–11 | 10,700 |
| 69.2 | 30.8 | 75.0 | 25.0 | 3.25 | 8.0 | 11,600 |
| 69.2 | 30.8 | 70.0 | 30.0 | 3.00 | 5–10 | 10,200 |
| 69.2 | 30.8 | 62.5 | 37.5 | 3.00 | 4.5–7 | 9,200 |
| 68.8 +0.6% $Zn(Ac)_2$ | 30.6 | 75.0 | 25.0 | 2.60 | 4.0 | 10,300 |
| 67.2 +3% $Zn(Ac)_2$ | 29.8 | 75.0 | 25.0 | 2.70 | 3.0 | 8,000 |
| 69.2 | 30.8 | 75.0 +5.0% Silicone R-23 | 25.0 | 3.25 | ---- | ------ |
| 100 | ------ | 72.5 +5% Silicone R-23 | 22.5 | ---- | ---- | 6,900 |

[a]Percentage by weight for solids and by volume for liquids.

TABLE VII.—PHYSICAL PROPERTIES OF o-ETHOXYBENZOIC ACID-EUGENOL-ZINC OXIDE MIXES CONTAINING VARIOUS ADDITIVES

| Composition[a] Solid | Composition[a] Liquid | Powder used for 0.4 ml of liquid | Initial Setting Time | Compressive Strength |
|---|---|---|---|---|
| | | *G.* | *Min.* | *P.s.i.* |
| 69.2% ZnO; 30.8% $Ca_3(PO_4)_2$ | 75.0% EBA; 25.0% Eugenol | 1.08 | ---------- | 6,000 |
| 81.8% ZnO; 19.2% Rosin | 75.0% EBA; 25.0% Eugenol | 2.75 | 6.5 | 4,400 |
| 75.0% ZnO; 25.0% MgO | 25.0% EBA; 75.0% Eugenol | ---------- | 5.5 | ---------- |
| 40.0% ZnO; 50.0% MgO; 10.0% CaO | 50.0% EBA; 50.0% Eugenol | ---------- | 4 | ---------- |
| 66.0% ZnO; 33.0% Quartz; 1.0% DMCA | 72.7% EBA; 27.3% Eugenol | 2.20 | 12.5 | 7,800 |

[a]Percentage by weight for solids and by volume for liquids.

*Chelating agents as accelerators of zinc oxide-eugenol.*—The effect of a 5% addition of a number of chelating agents on the setting times of the mixes and compressive strength of the products was investigated. Results of the setting time measurements at 37° C. and 100% relative humidity are given in Table VIII. Addition of acetic acid or a chelating agent increases the amount of powder that can be incorporated in the mix. All compounds, with the exception of ethylenediamine, accelerate the reaction. Compounds containing carboxylic acid groups give the shortest setting times. The compressive strength of the products is low.

The effect of addition of acetic acid or chelating agents to EBA is less pronounced (Table IX). Addition of these compounds lowers the powder-liquid ratio as well as the setting time.

*Effect of zinc oxide-EBA-eugenol mixtures on the polymerization of acrylic resins.*—Commercial self-curing acrylic monomer-polymer slurries placed over cements containing more than 5% eugenol do not harden. With cements containing 100% EBA or 95% EBA-5% eugenol, the acrylic slurry hardens rapidly in all cases. However, monomer from the acrylic softens the cement.

Acrylic resins also harden when placed over salicylaldehyde-zinc oxide mixtures. The cement is not readily attacked by the monomer. When this cement is placed in cavities of extracted teeth, the teeth are stained yellow, probably due to the presence of the aldehyde group.

TABLE VIII.—PROPERTIES OF ZINC OXIDE-EUGENOL MIXTURES CONTAINING ACETIC ACID OR CHELATING AGENTS

Temperature ______ °C __ 37
Relative humidity ______ percent __ 100

| Composition of Liquid | | | Powder used per 0.4 ml. liquid | Final Setting Time | Compressive Strength |
|---|---|---|---|---|---|
| Eugenol | | Additive | | | |
| Percent | Percent | | G. | Min. | P.s.i. |
| 100 | | | 1.30 | 540 | 3,000 |
| 99.5 | 0.5 | acetic acid | 2.25 | 12 | 1,800 |
| 95 | 5 | do | 2.25 | 6 | 3,500 |
| 95 | 5 | ethoxyacetic acid | 2.35 | 12 | 2,400 |
| 95 | 5 | lactic acid | 2.25 | 24 | ------ |
| 95 | 5 | acetylacetone | 2.35 | 73 | ------ |
| 95 | 5 | ethyl acetoacetate | 2.25 | 90 | ------ |

TABLE IX.—SETTING TIMES OF ZINC OXIDE-EBA MIXTURES CONTAINING ACETIC ACID OR A CHELATING AGENT

Temperature ______ 37° C.
Relative Humidity ______ 100%.
Composition of liquid ______ 95% EBA; 5% additive.

| Additive | Powder used per 0.4 ml. liquid | Final Setting Time |
|---|---|---|
| | G. | Min. |
| EBA | 2.30 | 88 |
| Acetic acid | 1.20 | 35 |
| Ethoxyacetic acid | 1.90 | 55 |
| Acetylacetone | 2.00 | 57 |

Specific examples of mixtures incorporating the features of the present invention are enumerated below.

EXAMPLE 1

2.30 grams of zinc oxide is incorporated into 0.4 gram of o-ethyoxybenzoic acid by spatulation. The putty-like mass sets to a hard adhesive having a compressive strength of 7200 p.s.i. within 11 min.

EXAMPLE 2

A red mercuric oxide-o-ethoxybenzoic acid mixture is prepared containing the maximum amount of mercuric oxide that can be incorporated into the liquid. The putty-like material sets within 4 min. to form a hard product.

EXAMPLE 3

Zinc oxide powder is thoroughly incorporated into o-salicylaldehyde. The slurry sets slowly to a hard cohesive product which does not inhibit vinyl polymerization.

EXAMPLE 4

Zinc oxide powder is spatulated into 0.4 ml. of 82.5% eugenol—17.5% o-ethoxybenzoic acid solution. The mix hardens in 3½ min. (zinc oxide-eugenol mixes containing no accelerator hardens only after 120 min.).

EXAMPLE 5

2.25 grams zinc oxide is spatulated into 0.4 ml. of a solution containing 75% o-ethoxybenzoic acid and 25% eugenol. The material sets within 18 min. The product which is suitable as an adhesive cement has a compressive strength of 10,600 p.s.i. and a density of 3.31 (zinc oxide-eugenol products have a compressive strength of 3,000 p.s.i. and a density of 2.68. Much less powder can be incorporated into zinc oxide eugenol mixes than into those containing o-ethoxybenzoic acid).

EXAMPLE 6

3.25 grams of powder (69.2% zinc oxide and 30.8% quartz) is mixed with 0.4 ml. liquid (75% o-ethoxybenzoic acid—25% eugenol). A hard cement is formed within 8 min. which has a crushing strength of 11,600 p.s.i.

It will be apparent that the embodiments shown are only exemplary and that various modifications can be made within the scope of invention as defined in the appended claims.

What is claimed is:

1. A hard, coherent rapid setting cementitious material suitable for use in dental procedures or the like comprising a mixture of an oxide selected from the group consisting of zinc-, manganese-, calcium-, barium-, cadmium-, and mercuric-oxide and a chelating agent selected from the group consisting of o-ethoxybenzoic acid, o-salicylaldehyde, o-ethoxybenzoyl chloride, 2-methoxy-4-phenylphenol, lactic acid, ethoxyacetic acid, acetylacetone, ethyl acetoacetate, citraconic anhydride and ethylenediamine.

2. A hard, coherent rapid setting cementitious material suitable for use in dental procedures or the like comprising a mixture of zinc oxide and a chelaitng agent selected from the group consisting of o-ethoxybenzoic acid, o-salicylaldehyde, o-ethoxybenzoyl chloride, 2-methoxy-4-phenol, lactic acid, ethoxyacetic acid, acetylacetone, ethyl acetoacetate, citraconic anhydride, and ethylenediamine.

3. A hard, coherent rapid setting cementitious material suitable for use in dental procedures or the like comprising a mixture of zinc oxide, eugenol, and a chelating agent comprising o-ethoxybenzoic acid.

4. The invention of claim 3 including a filler comprising powdered fused silica.

5. The invention of claim 1 in which the chelating agent is o-ethoxybenzoic acid.

6. The invention of claim 1 in which the chelating agent is o-salicylaldehyde.

7. The invention of claim 1 in which the chelating agent is o-ethoxybenzoyl chloride.

8. The invention of claim 1 in which the chelating agent is 2-methoxy-4-phenylphenol.

9. The invention of claim 1 in which the chelating agent is ethoxyacetic acid.

10. A hard, coherent rapid setting cementitious material suitable for use in dental procedures or the like comprising a mixture of approximately from .75 to .9 part by weight zinc oxide and approximately from .25 to .1 part by weight of o-ethoxybenzoic acid.

11. A hard, coherent rapid setting cementitious material suitable for use in dental procedures or the like comprising a mixture of powdered zinc oxide combined with a solution comprising approximately from 50 to 85% o-ethoxybenzoic acid and 15 to 50% eugenol.

12. A hard, coherent rapid setting filling material suitable for use in dental procedures or the like comprising a mixture of a powder containing approximately from 50 to 80% zinc oxide and from 20 to 50% quartz and a solution containing approximately from 50 to 85% o-ethoxybenzoic acid and from 15 to 50% eugenol.

References Cited in the file of this patent

UNITED STATES PATENTS

| | | |
|---|---|---|
| 2,044,968 | Bruson | June 23, 1936 |
| 2,406,063 | Crowell | Aug. 20, 1946 |

OTHER REFERENCES

Skinner: "The Science of Dental Materials," pub. 1954 by W. B. Saunders Co., Philadelphia (pages 148–149).

Martell et al.: "Chemistry of the Metal Chelate Compounds," pub. 1952, Prentice-Hall, New York (pp. 519, 543 and 547).